United States Patent Office 2,904,017
Patented Sept. 15, 1959

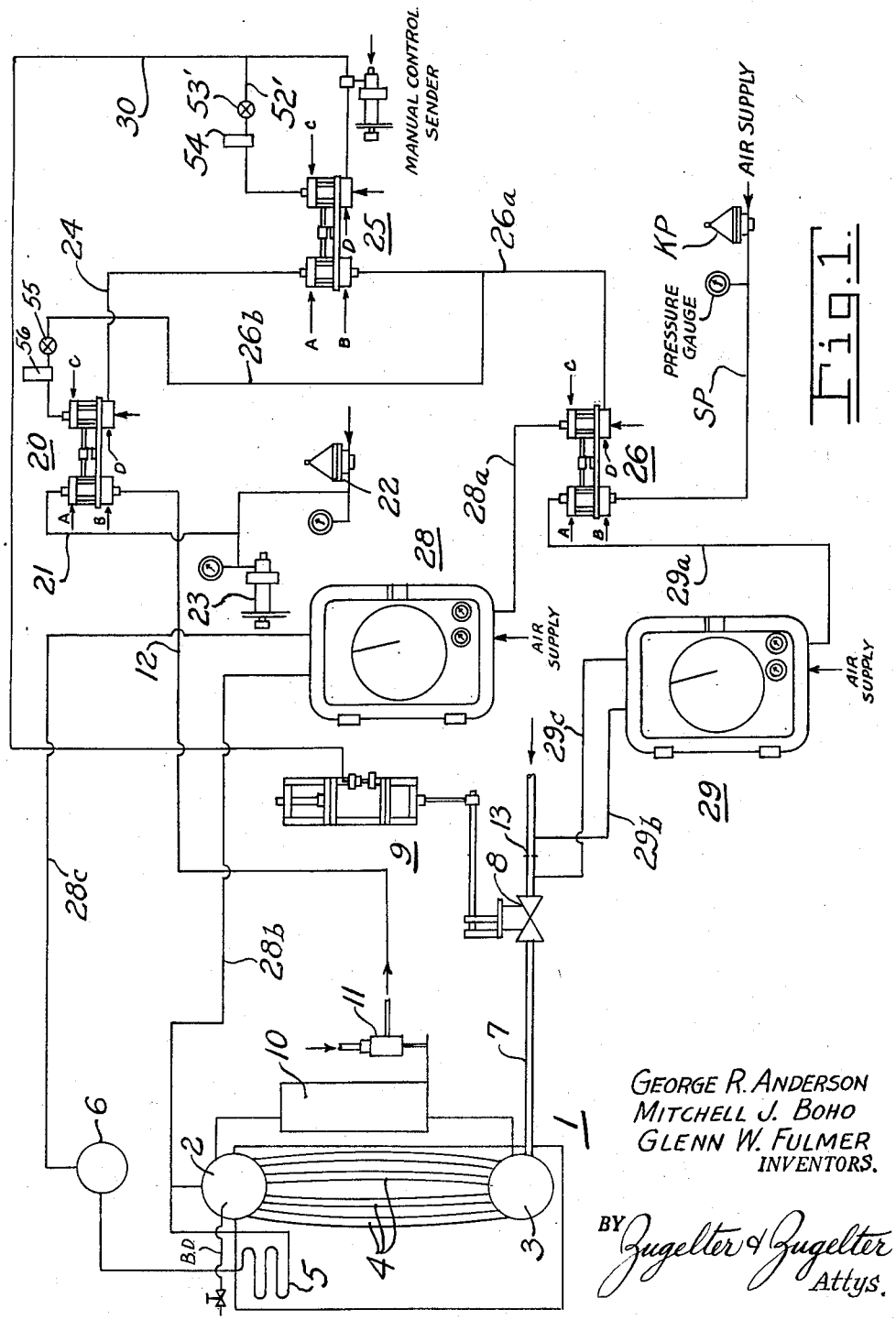

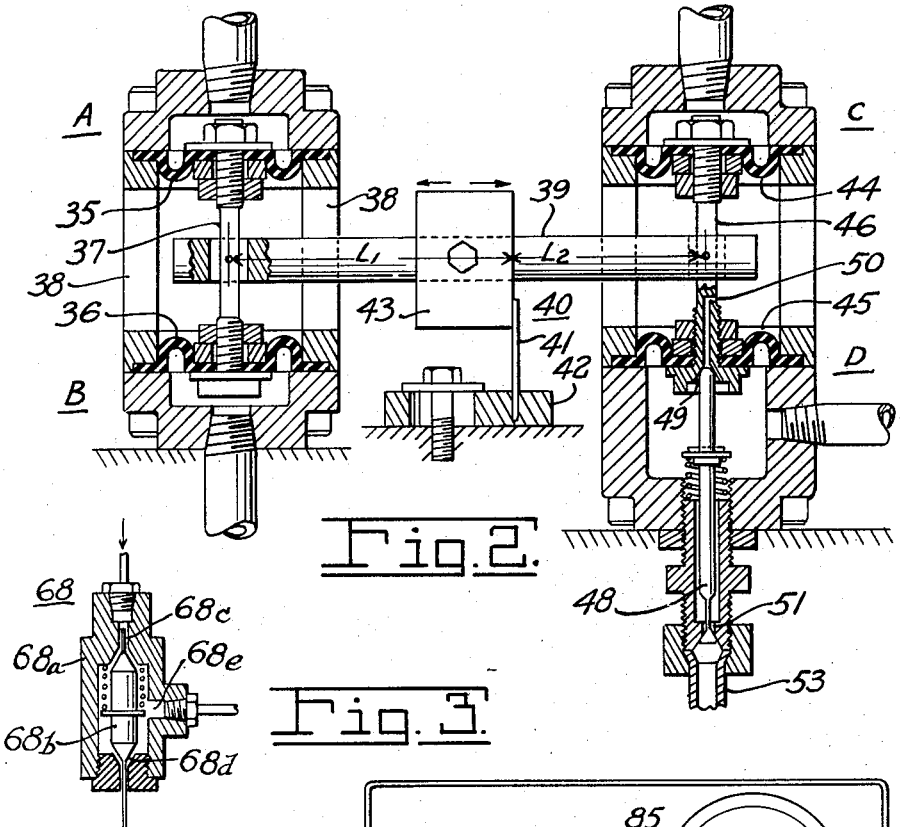
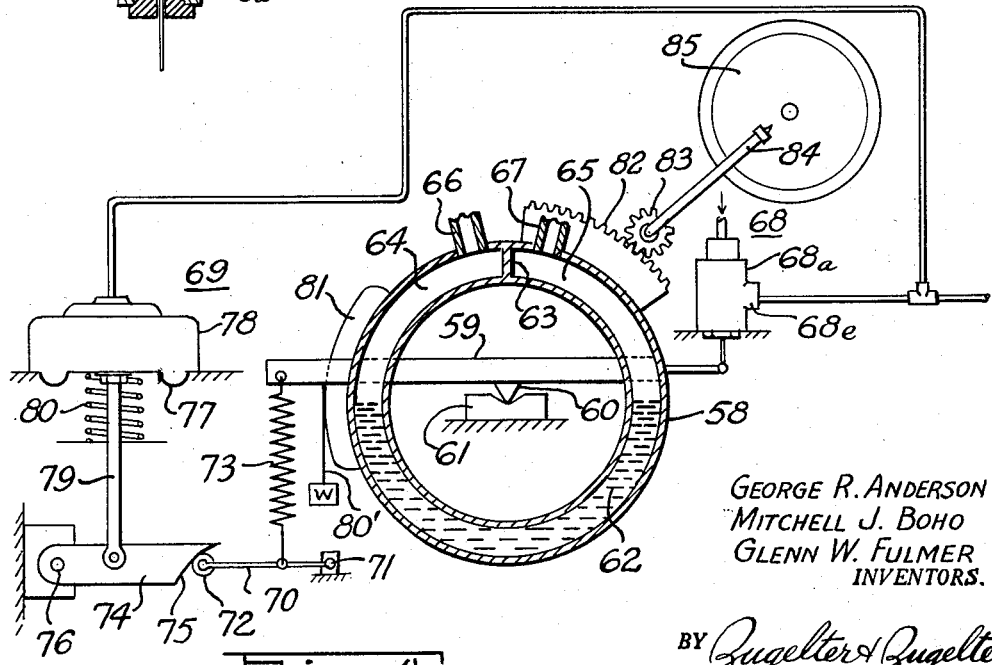

2,904,017

BOILER FEED WATER CONTROL SYSTEMS

George R. Anderson and Mitchell J. Boho, Mount Lebanon Township, Allegheny County, and Glenn W. Fulmer, Carnegie, Pa., assignors to Hagan Chemicals & Controls, Inc., a corporation of Pennsylvania Application December 24, 1954, Serial No. 477,575

6 Claims. (Cl. 122—451)

This invention relates to systems for controlilng automatically the rate of delivery of feed water to steam boilers, so that it is in relation to the steaming and the blow-down rates, and the water level in the boiler.

To properly control the rate of delivery of feed water to steam boilers several factors or conditions are involved, namely, the level of the water to be maintained in the boiler; the tendency of the water level to swell in varying degrees and at varying rates as effected by the steaming rate and the magnitude of the changes in the steaming rate resulting from fluctuating loads, and the rate of blow-down from the boiler.

An object of this invention is to provide a control system having means for developing a control impulse that varies with changes in the boiler water level, means for developing a control impulse that is preferably linearly proportional to the rate of steam flow out of the boiler, means for developing a control impulse that is preferably linearly proportional or substantially so as to the rate of water flow into the boiler, means for developing a single control force for regulating the flow of feed water into the boiler together with means for modifying the single control force in accordance with the blow-down rate, so that the rate of total flow of feed water to the boiler is directly proportional to the boiler water level, the steaming rate and the blow-down rate.

A further object of the invention is to provide means for pre-setting the boiler water level responsive means so that the water level will be regulated to a pre-selected level.

The above and other objects of the invention will be apparent to those with ordinary skill in the art to which the invention pertains from the following description and the drawings.

In the drawings:

Figure 1 is a more or less diagrammatic view of a steam boiler and a schematic illustration of a control system arranged and constructed in accordance with an embodiment of the invention;

Fig. 2 is a view of a totalizer, three of which are embodied in the control system shown in Fig. 1;

Fig. 3 is a view in section of an escapement valve embodied in several devices of Fig. 2; and Fig. 4 is a more or less diagrammatic view of a pressure responsive ring balance device as embodied in Fig. 1, two of such devices being used, one in connection with the rate of steam flow and the other in connection with the rate of feed water flow into the boiler, the device of Fig. 4 being arranged to develop an output pressure or control force that is linearly proportional to the steam flow rate on the one hand and to the feed water flow rate on the other.

In Fig. 1 of the drawings a steam boiler 1 is shown having a steam drum 2 and a lower drum 3 connected by water tubes 4. The steam from the drum 2 passes through a superheater 5 to a distribution header 6. Feed water to the boiler is delivered through a feed water line 7 in which is a valve 8 that is operated by a power cylinder 9. Power cylinder 9 may be of the construction illustrated in Robert R. Donaldson U.S. Patent No. 2,044,936.

The feed water level in the boiler is measured by a feed water level responsive regulator 10. Changes in water level in the boiler result in the operation of an escapement valve 11 by which a variable signal, for example, air pressure, is transmitted to a sending line 12. The magnitude of the pressure in line 12 is directly proportional to the water level in the boiler at any instant.

The rate of steam flow out of the boiler is measured by a steam flow responsive device 28 shown in more or less detail in Fig. 4. That device measures the pressure drop across the superheater 5 and delivers a signal pressure or control force to a sending line 28a that is preferably linearly proportional to the flow of steam.

The rate of flow of feed water to the boiler through line 7 is measured by a water flow responsive device 29 which for purposes of description may be of a construction similar to that of device 28. Device 29 responds to the pressure drop across an orifice 13 in line 7, and develops a control force or pressure that is transmitted to a control line 29a. Device 29 is preferably so constructed that the control force transmitted to line 29a is linear with the flow of feed water to the boiler.

The water level impulse in line 12 is delivered to a water level totalizer 20. The totalizer 20 may be of the construction illustrated in Fig. 2. The pressure supplied through line 12 to totalizer 20 is opposed by a set point pressure communicated to device 20 through a line 21. The pressure in line 21 may be pre-set to any desired value by means of a pressure regulator 22 or by means of a hand sender 23.

Totalizer 20 transmits an output pressure to a line 24 connected to a water flow regulating totalizer 25. Totalizer 25 includes means for providing rate action and automatic reset. The totalizer 25 may be of the same construction as the totalizer shown in Fig. 2, the construction and operation of which will be described infra. Totalizers 20 and 25 respond also to the output pressure of a totalizer 26, the output pressure being communicated to them by pipes 26a and 26b. The output pressure of totalizer 26 is proportional to and controlled by the output pressures of a steam flow responsive device 28 and the boiler feed water flow responsive device 29 and a device KP which delivers a set point pressure through line SP to totalizer 26. Devices 28 and 29, which optionally may be of the recording types, receive their steam flow and water flow pressure drops from pipe connections 28b and 28c, and 29b and 29c, respectively. Devices 28 and 29 are schematically illustrated by the device shown in Fig. 4 and operate to convert the pressure differentials across superheater 5 and orifice 13 into output pressures or signals that are linearly proportional to the steam flow and feed water flow and will be explained infra. As stated, the output pressures of devices 28 and 29 are transmitted to totalizer 26 through lines 28a and 29a, respectively. The pressure in line SP is adjustable but constant, being made so by a pressure regulator KP.

The output pressure or signal from totalizer 26 as stated, is impressed on totalizer 25 in opposed relation to the output pressure of totalizer 20. Those pressures so act on totalizer 25 that the output pressure thereof which is transmitted through a line 30 to water valve operator 9, will cause the flow of feed water into the boiler to be proportional to the steam flow rate and the water input rate impulse signals.

The output pressure or signal of totalizer 26 is also delivered to totalizer 20. That pressure so acts on totalizer 20 that its action is automatically modified to compensate for the blow-down from the boiler. The blow-down may be effected through a pipe B.D. having a valve or other device therein for controlling the rate of blow-down as required.

In the claims, control forces are identified as (a), (b), (c), (d), (e), (f), (g), (hr) and (h). These forces are identified below as to source and the particular totalizer upon which they act, as follows:

(a) The force developed by the water level responsoive means 10 and applied to totalizer 20.

(b) The force developed by the steam flow responsive means 28, and impressed on totalizer 26.

(c) The force developed by the feed water flow responsive means 29, and impressed on totalizer 26.

(d) The water level set point force as developed by device 22 or the hand sender 23, and impressed on totalizer 20.

(e) The feed water delivery rate set point control force as preset by device KP and impressed on totalizer 26.

(f) The output control force of totalizer 26 which is impressed on totalizers 20 and 25.

(g) The output control force of totalizer 20 which is impressed on totalizer 25.

(hr) The output control force of totalizer 25 which is fed back to the same through means which give automatic reset and rate action to it.

(h) The final output of totalizer 25 which produces the ultimate regulating factor by which the feed water is adjusted, and the required rate of delivery of feed water to the boiler is maintained under fluctuating load conditions and varying rates of blow-down.

The operation of the system shown in Fig. 1 will be better understood from the following description of the construction of totalizers 20, 25 and 26 as shown in Fig. 2 and the construction and operation of the transmitters 28 and 29.

The totalizer shown in Fig. 2 includes signal input housings A, B, and C, and a signal output housing D. Housings A and B are provided with pressure deflectable diaphragms 35 and 36 that are coupled together by a link or rod 37. The housings A and B are secured together by posts 38. The link 37 is connected to one end of a beam 39. That lever is provided with a fulcrum 40 in the form of a leaf spring 41 that is anchored in a block 42 which may be moved longitudinally of and parallel to the beam 39. The leaf spring fulcrum 41 is secured to beam 39 by a block 43 that is slidable along the beam to any desired position. It is to be understood that the block 43 and the fulcrum block 42 are adjusted simultaneously, after which the fulcrum block 43 is secured to the beam 39.

Pressure receiving unit C includes a diaphragm 44 and diaphragm unit D includes a diaphragm 45. These diaphragms are connected together by a link 46. Unit D is provided with a valve 48 one end of which is seated in an exhaust port seat 49 that communicates with the atmosphere through a passage 50 in the link 46. The opposite end of the valve 48 controls an inlet port 51 which is supplied by a pipe 53 with pressure of constant value. The pressure established by valve 48 is illustrated by the equations infra.

In order that the totalizer 25 may operate as a regulator having rate action and automatic reset characteristics, the pressure output of unit D is fed back to unit C to act on the diaphragm thereof. The feed back is through a line 52' in which is a restriction 53' such as a needle valve, and a volume or ballast chamber 54, between the needle valve 53 and unit C. The needle valve and chamber 54 provide rate action and automatic re-set for totalizer 25 in its operation as a regulator. Line 26b of unit C of totalizer 20 is provided with a restriction or needle valve 55 and a volume or ballast chamber 56 which together provide rate action response in totalizer 20.

The operation of the respective totalizers 20, 25 and 26 may be illustrated by the following mathematical relationships.

If it be assumed that the areas of diaphragms 35, 36, 44, and 45 of the totalizers are equal and the lever arms $L_1$ and $L_2$ represent the distances of the points of action of the diaphragms 35 and 36, and 44 and 45, respectively, to the fulcrum, and that the pressures acting on the diaphragms of units A, B, C and D are pressures $Pa$, $Pb$, $Pc$ and $Pd$, respectively, then the totalizer is in balance when the sum of the moments of the forces about the fulcrum, of the pressures $Pa$, $Pb$, $Pc$ and $Pd$, are zero.

The equation of balanced condition is:

$$PbL_1 - PaL_1 + PcL_2 - PdL_2 = 0.$$
$$PdL_2 = PbL_1 - PaL_1 + PcL_2.$$

$$\text{Pressure } Pd = \frac{L_1}{L_2}(Pb - Pa) + Pc$$

If $L_1/L_2$ is fixed for any given setting, then $L_1/L_2$ is a constant K and $Pd = K(Pb - Pa) + Pc$.

From the preceding equation for the value $Pd$, it is seen that a change in any one of the pressures $Pa$, $Pb$, or $Pc$ will produce a change in the output signal or pressure $Pd$; and that by changing the ratio of $L_1/L_2$, the value of $(Pb - Pa)$ with respect to $Pc$, may be changed accordingly.

Applying the foregoing equations to the totalizers 20 and 26, and using the control force designations given supra, it follows that the signal pressure (g) in line 24 is equal to $[(L_1/L_2)(a-d) + K_r f]$, where $L_1/L_2$ is equal to a constant $K_1$ and $K_r$ represents the rate action factor determined by needle valve 55 and volume chamber 56. Also it is seen that the signal pressures $f$ in lines 26a and 26b are equal to $[(L_1/L_2)(e-c) + b]$ where $L_1/L_2$ is equal to a constant K.

With reference to totalizer 26, the constant K is the ratio of the lever arms $L_1/L_2$, and the forces developed by pressures on the diaphragms of units A, B and C have been designated (c), (e) and (b) respectively, and the force developed on the diaphragm of unit D is (f) which is the output signal of totalizer 26. By substituting the values (c), (e), (b) and (f) in the above equations, the output force $(f) = [K(e-c) + b]$.

With reference to totalizer 20, the constant $K_1$ is used. The constant $K_1$ is derived in the same manner as the constant K by substituting the forces (a), (d), (f) and (g) for the forces $Pb$, $Pa$, $Pc$ and $Pd$ in the above equations. Thus $(g) = [K_1(a-d) + f]$ and $K_1 = (g) - f/a - d)$.

The totalizer 25 can similarly be analyzed and, for convenience, the ratio of its lever arms $L_1/L_2$ may be given a different subscript and written as $K_2$. In all cases when $L_1 = L_2$, the constant is equal to unity.

The output pressure $h$ of totalizer 25 as delivered to line 30 is the ultimate regulating pressure or signal for controlling the delivery of feed water to the boiler. The ultimate signal $h$ is equal to $[(L_1/L_2)(f-g) + hr]$ where $L_1/L_2$ is equal to a constant $K_2$ and $hr$ is the rate action factor produced by needle valve 53 and volume chamber 54, and also provides the automatic reset.

Since the totalizer 20 is affected by the pressure delivered by the totalizer 26 through line 26b the output signal in line 24 of totalizer 20 delivered to totalizer 25 will modify the rate of feed water delivery to the boiler in accordance with the rate of blow-down. In other words, the loading of totalizer 20 by the pressure in line 26b has the effect of calling for a higher water level in the boiler as though the water level were actually lower than at which it should be maintained.

The loading pressure or set point pressure (e) supplied by the device KP to totalizer 26 determines the control point of totalizer 26. Likewise, the set point pressure (d) on totalizer 20 as modified by the pressure from line 26b, determines the set point water level to be maintained in the boiler. Thus the system as a whole operates to provide such a rate of flow of water to the boiler that the rate is fixed by the water level to be maintained in the boiler, the amount of blow-down from the boiler and the amount of steam generated in the boiler and delivered to steam consuming apparatus.

Devices 28 and 29 receive the pressure differentials developed by steam flow and water flow, as stated supra. Since these differentials are proportional to the pressure drops across the superheater 5 and the feed water orifice 13, respectively, the respective values of these differentials are proportional to the square of steam flow and the square of the water flow. Since the water level control force is linear with water level changes, it is preferred that the devices 28 and 29 extract the square root of the steam flow and water flow differentials so that signals or forces (b) and (c) as delivered to totalizer 26 will be linear with the rates of steam and feed water flows.

In Fig. 4 a device is schematically shown which will serve to illustrate the form of devices 28 and 29 and their mode of operation. A specific device suitable for the purpose is shown in Robert R. Donaldson application Serial No. 224,194, filed May 2, 1951, now Patent No. 2,170,015, and assigned to Hagan Corporation of Pittsburgh, Pennsylvania.

As illustrated in Fig. 4, the device comprises a hollow ring 58 having a bar 59 to which is secured a frictionless bearing 60, such as a knife edge, at its center. Bearing 60 is supported by a bearing way 61. The interior of ring 58 contains a quantity of heavy liquid 62, such as mercury, and is provided at its top with a partition or baffle 63 which, with the liquid 62 divides the interior of the ring into sealed chambers 64 and 65. On each side of the baffle 63, the ring is provided with fittings 66 and 67. In the case of device 28 fittings 66 and 67 are connected to pipes 28b and 28c, while in the case of device 29, these fittings are connected to pipes 29b and 29c respectively. Therefore the force acting on the baffle 63 will be proportional to the steam flow differential or the water flow differential as the case may be. That pressure differential turns ring 58 clockwise. As the ring turns, a valve 68 is actuated that transmits an output pressure the value of which is determined by the amount of circular motion of the ring. Valve 68 is shown in Fig. 3.

Valve 68 as shown in Fig. 3 comprises a body 68a having therein a valve 68b provided with cone-shaped ends for controlling an inlet port 68c and an exhaust port 68d. The body 68a is provided with an outlet port 68e through which the control force is delivered to line 28a in the case of device 28 and to line 29a in the case of device 29.

The inlet port 68c is supplied with a constant pressure supply source such as compressed air. The position of the ends of valve 68b with respect to the inlet and exhaust ports 68c and 68d determines the value of the outlet pressure at port 68e. For example, when the inlet port is completely closed and the exhaust port is open, the pressure at port 68e is atmospheric; when the exhaust port is completely closed and the inlet port is open the pressure at port 68e will be equal to the pressure of the supply source; and when the valve 68b occupies intermediate positions the pressure at port 68e will have an intermediate value, which value can be one of a multitude of values in between maximum and minimum.

In order that the output of valve 68 shall be linearly proportional to the flow (steam or feed water) means 69 are provided for causing the ring to take such a position for every input pressure differential to the opposite sides of baffle 63, that the output pressure of valve 68 will be proportional to the square root of that input differential.

Means 69 includes a lever 70 mounted on a pivot 71 at one end and provided with a cam follower 72 at the other. Lever 70 is connected by a tension spring 73 to an extension of bar 59, and therefore to the ring. The tension in spring 73 resists turning of the ring 58. The resistance is supplied by a lever 74 having a square root cam 75 that engages the follower 72 on lever 70. Cam lever 74 is mounted on a pivot 76 and actuated by a diaphragm 77 in a housing 78 supplied with the output pressure of valve 68. Diaphragm 77 is connected to the lever by a push rod 79. The diaphragm 77 works against a compression spring 80. Therefore, for every value of pressure on diaphragm 77 the cam lever 74, and the lever 70 will take a definite and corresponding position. Since the angular travel of lever 70 is controlled by the cam surface 75, the tension in spring 73 will be proportional to the square root of the input pressure to fitting 65. The tension of spring 73 modifies the ring travel to such extent that the output pressure of valve 68, is equal to a constant times the square root of the pressure input to the ring at fitting 65.

If necessary, ring 65 may be counter-balanced by a weight W suspended from a flexible member 80' attached to the ring and operating over a sector 81.

Ring 65 may be provided with means, such as a gear segment 82 and pinion 83 for operating a pen arm 84 arranged to trace a curve on recording chart paper 85.

Having thus described the invention it will be apparent to those of ordinary skill in the art, that various modifications and changes may be made in the illustrated embodiments without departing from either the spirit or the scope of the invention.

Therefore, what is claimed as new and desired to be secured by Letters Patent is:

1. A feed water regulating system including a steam boiler having a feed water line, a feed water control valve in said line and an operator for positioning the valve to control the rate of delivery of boiler feed water, said system comprising means responsive to boiler water level and having means actuated thereby for developing a control force (a) the magnitude of which is linearly proportional to said level, means for developing a pressure differential that is proportional to the square of the rate of steam flow, means responsive to the stem flow pressure differential, said steam flow differential responsive means having a steam flow control impulse sender for developing a control force (b) and a square root loader responsive to said force (b) and acting on said steam flow differential responsive means for causing the control force (b) to be proportional to the square root of the steam flow differential and therefore linearly proportional to the rate of steam flow, means for developing a pressure differential in the feed water line, means responsive to the feed water pressure differential, said feed water pressure differential responsive means having an impulse sender for transmitting a control force (c) and a square root loader responsive to said force (c) and acting upon the feed water differential responsive means to cause the force (c) to be proportional to the square root of the feed water pressure differential and therefor linearly proportional to the rate of feed water flow, means for providing a boiler water level set point control force (d), means for providing a feed water flow rate set point control force (e), a first totalizer having actuating means responsive respectively, to the set point control force (e), the steam flow rate control force (b) and the water flow control force (c) and having means actuated by said actuating means for developing a control force (f) whose value is equal to $(k(e-c)+b)$, a second totalizer having actuating means responsive respectively to the water level set point control force (d), the water level control force (a) and the control force (f) and having means actuated by said actuating means for developing a control force (g) whose value is equal to $(k_1(a-d)+f)$, and a third totalizing means responsive jointly to the control force (g) and the control force (f) and having means actuated by said third totalizing means for developing and transmitting a regulating control force (h) to the feed water valve operator to so actuate the same that a predetermined relationship is maintained between said totalizer forces (f) and (g), when (k) and ($k_1$) are constants and equal to $(f-b)/(e-c)$ and $(g-f)/(e-c)$, respectively.

2. A feed water control system according to claim 1, characterized by the fact that control forces (b), (e), (c), and $(f)$ are pneumatic forces, that the first totalizer means comprises a beam mounted on a fulcrum, a pair of pressure-receiving units each having a diaphragm, means coupling the diaphragms to said beam at a distance $L_1$ from the fulcrum, the set point control force $(e)$ acting on one of said diaphragms and the control force $(c)$ acting on said other diaphragm, a second pair of pressure-receiving units, each having a diaphragm, the diaphragms of said second pair being connected to said beam in opposition to one another at a distance $L_2$ from the fulcrum, valve means actuated by said beam for establishing a control force $(f)$ on one of said diaphragms in force opposing relation to force $(e)$, control force $(b)$ acting on the other diaphragm of said second pair of units, the sum of the moments of the forces $(b)$, $(e)$, $(c)$, and $(f)$ about the fulcrum being zero when $(eL_1-cL_1+bL_2-fL_2)=0$.

3. A feed water control system according to claim 1 characterized by the fact that the control forces $(a)$, $(d)$, $(f)$, and $(g)$ are pneumatic forces, and that the second totalizer means comprises a beam mounted on a fulcrum, a pair of pressure-receiving units each having a diaphragm, means coupling the diaphragms to said beam at a distance $L_1$ from the fulcrum, the said point control force $(d)$ acting on one of said diaphragms and the control force $(a)$ acting on said other diaphragm, a second pair of pressure-receiving units, each having a diaphragm, the diaphragms of said second pair being connected to said beam in opposition to one another at a distance $L_2$ from the fulcrum, valve means actuated by said beam for establishing a control force $(g)$ on one of said diaphragms in force opposing relation to force $(a)$, control force $(f)$ acting on the other diaphragm of said second pair of units, the sum of the moments of the forces $(a)$, $(d)$, $(f)$, and $(g)$ about the fulcrum being zero when $(aL_1-bL_1)+(fL_2-gL_2)=0$.

4. A feed water control system according to claim 3 in which means are provided for controlling the rate of change of control force $(g)$.

5. A feed water control system as in claim 1 characterized by the fact that forces $(g)$, $(f)$, and $(h)$ are pneumatic, and that the third totalizing means comprises a beam mounted on a fulcrum, a pair of pressure-receiving units each having a diaphragm, means coupling said diaphragms to the beam at a distance $L_1$ from the fulcrum, control force $(f)$ acting on one of said diaphragms and control force $(g)$ acting on the other diaphragm, a second pair of pressure-receiving units each of which is provided with a diaphragm, the diaphragms of said second pair being connected to said beam in opposition to each other at a distance $L_2$ from the fulcrum, valve means actuated by said beam for developing control force $(h)$ to which one of the diaphragms of said second pair of units responds, said control force $(h)$ controlling the feed water valve operator also, and means for so controlling the rate of change of force $(h)$ as delivered to said one of the diaphragms of said second pair of units and to said valve operator, that rate response and automatic reset action in said third totalizer means are provided, the sum of the moments of the forces $(g)$, $(f)$, and $(h)$ about the fulcrum being zero when $(fL_1-gL_1)+(hrL_2)=0$, where $(hr)$ is the rate of change of force $(h)$ and is equal to $(h)$ at balance.

6. The combination with a steam boiler having a boiler feed line and a regulating valve therein, an operator for positioning the feed water valve, a restriction in the feed water line for developing a pressure difference that is proportional to the square of the feed water flow, and a steam line to which the boiler steam is delivered, said line being provided with means for developing a pressure differential proportional to the square of the steam flow, of a control system for actuating said feed line valve operator comprising means responsive to boiler water level and having means actuated thereby for developing a control force $(a)$ the magnitude of which is linearly proportional to said level, means responsive to the steam flow pressure differential, said steam flow pressure differential responsive means having a steam flow control impulse sender for developing a control force $(b)$ and a square root loader responsive to said force $(b)$ and acting on said steam flow differential responsive means for causing the control force $(b)$ to be proportional to the square root of the steam flow differential and therefore linearly proportional to the rate of steam flow, means responsive to the feed water flow differential, said feed water differential responsive means having a sender for transmitting a control force $(c)$ and a square root loader responsive to said force $(c)$ and acting upon the feed water differential responsive means to cause the force $(c)$ to be proportional to the square root of the feed water differential and linearly proportional to the rate of feed water flow, means for providing a boiler water level set point control force $(d)$, means for providing a feed water flow rate set point control force $(e)$, a first totalizer having actuating means responsive respectively, to the set point control force $(e)$, the steam flow rate control force $(b)$ and the water flow control force $(c)$ for developing a control force $(f)$ whose value is equal to $(k(e-c)+b)$, a second totalizer having actuating means responsive respectively, to the water level set point control force $(d)$, the water level control force $(a)$ and the control force $(f)$ for developing a control force $(g)$ whose value is equal to $(k_1(a-d)+f)$, and a third totalizer having actuating means responsive respectively, to the control force $(g)$ and the control force $(f)$ and an actuated means for developing and transmitting a regulating control force $(h)$ to the feed water valve operator to so actuate the same that a predetermined relationship is maintained between said totalizer forces $(f)$ and $(g)$, where $(k)$ and $(k_1)$ are constants and equal to $(f-b)/(e-c)$ and $(g-f)/(a-d)$, respectively.

References Cited in the file of this patent

UNITED STATES PATENTS

| | | |
|---|---|---|
| Re. 21,804 | Gorrie | May 20, 1941 |
| 1,949,408 | Bristol | Mar. 6, 1934 |
| 2,743,710 | Shannon | May 1, 1956 |